(12) United States Patent  
Yahiaoui et al.

(10) Patent No.: US 7,678,716 B2
(45) Date of Patent: Mar. 16, 2010

(54) HYDROGEL-WEB COMPOSITES FOR THERMAL ENERGY TRANSFER APPLICATIONS AND METHODS OF MAKING THE SAME

(75) Inventors: Ali Yahiaoui, Roswell, GA (US); Anthony Stephen Spencer, Woodstock, GA (US); Charles Edward Bolian, II, Buford, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 653 days.

(21) Appl. No.: 11/513,690

(22) Filed: Aug. 31, 2006

(65) Prior Publication Data

US 2008/0057284 A1 Mar. 6, 2008

(51) Int. Cl.
*B32B 27/04* (2006.01)
(52) U.S. Cl. .......................... 442/63; 442/118; 442/119; 604/104; 602/43
(58) Field of Classification Search ............ 442/64, 442/118, 119, 63; 602/43; 607/104
See application file for complete search history.

(56) References Cited

U.S. PATENT DOCUMENTS

| 3,338,992 | A | 8/1967 | Kinney |
| 3,341,394 | A | 9/1967 | Kinney |
| 3,502,538 | A | 3/1970 | Peterson |
| 3,502,763 | A | 3/1970 | Hartmann |
| 3,542,615 | A | 11/1970 | Dobo et al. |
| 3,692,618 | A | 9/1972 | Dorschner et al. |
| 3,802,817 | A | 4/1974 | Matsuki et al. |
| 3,849,241 | A | 11/1974 | Butin et al. |
| 4,242,242 | A | 12/1980 | Allen |
| 4,340,563 | A | 7/1982 | Appel et al. |
| 4,391,278 | A | 7/1983 | Cahalan et al. |
| 4,488,928 | A | 12/1984 | Ali Khan et al. |
| 4,499,154 | A | 2/1985 | James et al. |
| 4,703,801 | A | 11/1987 | Fry et al. |
| 4,842,768 | A | 6/1989 | Nakao et al. |
| 4,889,757 | A | 12/1989 | Horigome et al. |
| 5,382,400 | A | 1/1995 | Pike et al. |
| 5,403,870 | A | 4/1995 | Gross |
| 5,411,497 | A | 5/1995 | Tanzer |
| 5,478,308 | A | 12/1995 | Cartmell et al. |

(Continued)

FOREIGN PATENT DOCUMENTS

EP 0290814 A2 11/1988

(Continued)

OTHER PUBLICATIONS

Patent Abstracts of Japan, JP 02173108A, Jul. 4, 1990.

(Continued)

*Primary Examiner*—N. Edwards
(74) *Attorney, Agent, or Firm*—Richard M. Shane (57) ABSTRACT

The present disclosure is generally directed to hydrogel-fibrous web composites that can be used various heat transfer applications. For instance, the thermally conductive hydrogel-fibrous web composite can be used as a skin-contacting layer in a thermal energy transfer pad used to control patient body temperature. The hydrogel polymer is integral to the fibers of the web. Thus, the hydrogel-fibrous web composite provides good thermal conductivity and skin adhesion properties. The present disclosure is also generally directed to methods of preparing the hydrogel-fibrous web composites.

11 Claims, 3 Drawing Sheets

U.S. PATENT DOCUMENTS

| | | | |
|---|---|---|---|
| 5,503,908 A * | 4/1996 | Faass | 428/198 |
| 5,800,685 A | 9/1998 | Perrault | |
| 5,814,567 A | 9/1998 | Yahiaoui et al. | |
| 5,951,537 A | 9/1999 | Osborn, III | |
| 5,973,015 A * | 10/1999 | Coronado et al. | 521/64 |
| 6,028,016 A | 2/2000 | Yahiaoui et al. | |
| 6,146,747 A | 11/2000 | Wang et al. | |
| 6,197,045 B1 * | 3/2001 | Carson | 607/104 |
| 6,375,674 B1 * | 4/2002 | Carson | 607/104 |
| 6,461,379 B1 | 10/2002 | Carson et al. | |
| 6,473,910 B2 | 11/2002 | Creagan et al. | |
| 6,482,422 B1 | 11/2002 | Paul et al. | |
| 6,506,394 B1 | 1/2003 | Yahiaoui et al. | |
| D471,987 S | 3/2003 | Hoglund et al. | |
| D472,322 S | 3/2003 | Hoglund et al. | |
| D474,544 S | 5/2003 | Hoglund et al. | |
| 6,613,703 B1 | 9/2003 | Yahiaoui et al. | |
| 6,620,187 B2 | 9/2003 | Carson et al. | |
| 6,626,961 B1 | 9/2003 | Everhart et al. | |
| 6,645,232 B2 | 11/2003 | Carson | |
| 6,645,407 B2 | 11/2003 | Kellenberger et al. | |
| 6,648,905 B2 * | 11/2003 | Hoglund et al. | 607/104 |
| D483,125 S | 12/2003 | Hoglund et al. | |
| 6,660,027 B2 | 12/2003 | Gruszecki et al. | |
| 6,669,715 B2 | 12/2003 | Hoglund et al. | |
| D487,147 S | 2/2004 | Ellingboe et al. | |
| 6,699,267 B2 | 3/2004 | Voorhees et al. | |
| 6,699,715 B1 * | 3/2004 | Ledbetter et al. | 435/328 |
| 6,716,929 B2 | 4/2004 | Wilson | |
| 6,727,196 B2 | 4/2004 | Yahiaoui et al. | |
| 6,767,508 B1 | 7/2004 | Yahiaoui et al. | |
| 6,799,063 B2 | 9/2004 | Carson | |
| 6,818,012 B2 | 11/2004 | Ellingboe | |
| 6,827,728 B2 | 12/2004 | Ellingboe et al. | |
| 6,835,678 B2 | 12/2004 | Jackson et al. | |
| 6,872,275 B2 | 3/2005 | Ko et al. | |
| 6,918,981 B2 | 7/2005 | Ko et al. | |
| 6,927,316 B1 | 8/2005 | Faries, Jr. et al. | |
| 6,939,553 B2 | 9/2005 | Yahiaoui et al. | |
| 6,984,279 B2 | 1/2006 | Mortell et al. | |
| 7,001,953 B2 | 2/2006 | Chen et al. | |
| 7,018,497 B2 | 3/2006 | Ko et al. | |
| 7,018,945 B2 | 3/2006 | Yahiaoui et al. | |
| 7,045,559 B2 * | 5/2006 | Yahiaoui et al. | 523/111 |
| 7,086,095 B2 | 8/2006 | Faulks | |
| 7,270,721 B2 * | 9/2007 | Hilfenhaus et al. | 156/60 |
| 7,316,919 B2 | 1/2008 | Childs et al. | |
| 7,470,656 B2 * | 12/2008 | Sherry et al. | 510/438 |
| 2004/0242770 A1 | 12/2004 | Feldstein et al. | |
| 2005/0112151 A1 | 5/2005 | Horng | |
| 2005/0136023 A1 | 6/2005 | Yahiaoui et al. | |
| 2005/0136077 A1 | 6/2005 | Yahiaoui et al. | |
| 2008/0057809 A1 * | 3/2008 | Rock | 442/64 |

FOREIGN PATENT DOCUMENTS

| | | |
|---|---|---|
| EP | 1607412 A1 | 12/2005 |
| WO | WO 00/40185 | 7/2000 |
| WO | WO 00/76441 | 12/2000 |
| WO | WO 02/087414 | 11/2002 |
| WO | WO 03/030790 | 4/2003 |
| WO | WO 2004/060255 | 7/2004 |
| WO | WO 2004/073843 | 9/2004 |
| WO | WO 2007/070184 | 6/2007 |

OTHER PUBLICATIONS

"Artic Sun System," http://www.medivance.com/pages/PadDesign.html, Medivance Inc., viewed and printed Aug. 25, 2006, 2 pages.

Berner, G. et al., "Photoinitiators—An Overview," *Journal of Radiation Curing*, vol. 6, No. 2, Apr. 1979, pp. 2-9.

"Pad Warming . . . Patient Comfort or Patient Risk?," *Hotline News*, vol. 3, Issue 1, Jan. 1998, 1 page.

Kimberly-Clark® Patient Warming System, Product Information, 2006, 2 pages.

"A Clinical Compendium," Product Information, Kimberly-Clark® Patient Warming System, 2006, 12 pages.

"Superior warming and improved outcomes mean one less worry.", Product Information, Kimberly-Clark® Patient Warming System, 2006, 12 pages.

* cited by examiner

HYDROGEL-WEB COMPOSITES FOR THERMAL ENERGY TRANSFER APPLICATIONS AND METHODS OF MAKING THE SAME

BACKGROUND

Fabrics, including both woven webs and nonwoven webs, and their manufacture have been the subject of extensive development resulting in a wide variety of materials for numerous applications. There have also been developed different ways and equipments to make fibrous webs having desired structures and compositions suitable for these uses. However, it is not always possible to efficiently produce a fibrous web having all the desired properties as formed, and it is frequently necessary to treat the fibrous web to improve or alter one or more properties. For instance, many fibrous webs have a limited ability to absorb water or water vapor.

Hydrogel polymers are known for their effective heat transfer properties as well as their adhesive properties. As such, hydrogels have been used as a component in various pads used for heating or cooling patients whose body temperature needs to be controlled by external means. The hydrogel polymer is used in a layer in direct contact with the skin of the patient. Desirably, the skin-contacting layer will provide good adhesion of the pad to the skin, provide good structural integrity, minimize adverse effects on the skin, and provide efficient heat transfer.

Additionally, the hydrogel layer remains a significant portion of the cost of temperature control pads, which pads are generally discarded after use by a single patient. Thus, there remains a need for new low-cost hydrogel layers for use in temperature control pads and other heat transfer devices.

SUMMARY

In accordance with one embodiment, a method for integrating a thermally conductive hydrogel polymer into a fibrous web is generally provided. The method includes applying a hydrogel precursor formulation to a fibrous web and polymerizing the hydrogel monomer. The hydrogel precursor formulation includes a hydrogel monomer, a crosslinker, and, optionally, an initiator. Polymerization of the hydrogel monomer forms a hydrogel polymer having a three-dimensional crosslinked structure that is integral to the fibrous web. Further steps may be used, such as drying the hydrogel to control the water content of the hydrogel.

In another embodiment, a thermally conductive hydrogel-fibrous web composite includes a web of fibers and a hydrogel polymer integrated within the fibers of the web. The hydrogel polymer has a three-dimensional crosslinked structure that is intertwined with the fibers of the web.

The hydrogel monomers can include N-vinyl pyrrolidone, hydroxyethyl methacrylate, methacrylic acid or its salt, styrene sulfonic acid or its salt, potassium sulfopropyl acrylate, dimethyl acrylamide, dimethyl amino ethyl methacrylate or its quaternary salt derivative, or acrylamido methyl propane sulfonic acid or its salt. The initiator can be a photo-initiator, such that polymerization of the hydrogel monomer is initiated by UV light. The crosslinker can be methylene-bis-acrylamide, diethylene glycol diacrylate, poly(ethylene glycol) diacrylate, triethylene glycol-bis-methacrylate, ethylene glycol-bis-methacrylate, ethylene glycol-dimethacrylate, bisacrylamide, triethyleneglycol-bis-acrylate, 3,3'-ethylidene-bis(N-vinyl-2-pyrrolidone), trimethylolpropate trimethacrylate, glycerol trimethacrylate, polyethylene glycol dimethacrylate, or polymethacrylate crosslinkers. In some embodiments, the hydrogel precursor solution includes a soulublizer, a surfactant or other ingredients.

The fibrous webs may include, for example, nonwoven webs. In one embodiment, the nonwoven web may be a spunbond web, a meltblown web, a spunbond/meltblown/spunbond laminate, an airlaid web, or a bonded carded web.

The hydrogel-fibrous web composite can be included in a variety of end products, such as, for example, thermal energy transfer pads.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

DEFINITIONS

As used herein, the term "hydrogel" refers to a polymeric material that is capable of absorbing more than 20% its weight in water while maintaining a distinct three-dimensional structure. Additionally, the term "hydrogel monomer" may refer to the polymerizing formulation or hydrogel precursor (including the hydrogel monomer) which is converted to a hydrogel when polymerization is triggered via conventional processes such as UV radiation (or UV curing), gamma rays, electron-beam, heat, chemical initiation, etc., as discussed elsewhere herein.

As used herein, the term "fibrous web" includes any web having a structure of individual threads (e.g., fibers or filaments), including woven webs, nonwoven webs, scrim, knitted webs, etc.

As used herein, the term "nonwoven web" refers to a web having a structure of individual threads (e.g., fibers or filaments) that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 micrometers in diameter, and generally tacky when deposited onto a collecting surface.

As used herein, the term "spunbond web" generally refers to a web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. The filaments may, for example, have a length much greater than their diameter, such as a length to diameter ratio ("aspect ratio") greater than about 15,000 to 1, and in some cases, greater than about 50,000 to 1. The filaments may sometimes have diameters less than about 40 micrometers, and are often between about 5 to about 20 micrometers.

As used herein "carded webs" refers to nonwoven webs formed by carding processes as are known to those skilled in the art and further described, for example, in coassigned U.S. Pat. No. 4,488,928 to Alikhan and Schmidt which is incorporated herein in its entirety by reference. Briefly, carding processes involve starting with staple fibers in a bulky batt that is combed or otherwise treated to provide a generally uniform basis weight. A carded web may then be bonded by conventional means as are known in the art such as for example through air bonding, ultrasonic bonding and thermal point bonding.

As used herein, an "airlaid" web is a fibrous web structure formed primarily by a process involving deposition of loose, air-entrained fibers onto a porous or foraminous forming surface. Generally, the web includes cellulosic fibers such as those from fluff pulp that have been separated from a mat of fibers, such as by a hammermilling process, and then entrained in a moving stream of air and deposited or collected on the forming screen or other foraminous forming surface, usually with the assistance of a vacuum supply, in order to form a dry-laid fiber web. There may also be other fibers such as thermoplastic staple fibers or binder fibers present, and typically following collection of the fibers on the forming surface the web is densified and/or bonded by such means as thermal bonding or adhesive bonding. In addition, super absorbent materials in particulate or fiber form may be included in airlaid webs where desired. Equipment for producing air-laid webs includes the Rando-Weber air-former machine available from Rando Corporation of New York and the Dan-Web rotary screen air-former machine available from Dan-Web Forming of Risskov, Denmark.

DETAILED DESCRIPTION

Generally speaking, the present invention is directed to thermally conductive hydrogel-fibrous web composites. The thermally conductive hydrogel-fibrous web composites may be useful as a thermal energy transfer layer in a temperature control device. The web can act as a scaffold or support matrix that enhances mechanical properties of the hydrogel, during both manufacture and use of the temperature control device. Thermal energy transfer properties and skin adhesion properties can be controlled, for example, by the relative hydrogel content in the hydrogel-fibrous web composite, the relative water content in the hydrogel, and selection of the hydrogel polymer.

The hydrogel polymer is desirably integral to the fibers of the web. For example, the hydrogel polymer can be intertwined with the fibers of the webs. As such, the hydrogel polymer cannot be easily separated from the web and is effectively a permanent part of the structure of the web. Desirably, the hydrogel extends through the thickness of the web. More desirably, the hydrogel extends beyond the thickness of the web. As such, the thickness of the web will be smaller than the thickness of the hydrogel. Without wishing to be bound by theory, the inventors believe that thermal energy transfer properties and adhesive properties are improved by minimizing the number of fibers at the external surfaces of the hydrogel-fibrous web composite.

In order to integrate the hydrogel polymer into the fibrous web, the hydrogel polymer is polymerized from monomers that have been saturated and impregnated within the fibrous web. Upon polymerization, the resulting hydrogel polymer forms within the fibrous web, effectively integrating the hydrogel polymer within the fibers of the web. For instance, the hydrogel polymer can be intertwined with the fibers of the web. Also, the hydrogel polymer typically crosslinks with itself to form a three-dimensional polymer network that is integral to and intertwined with the fibers of the web. As such, the hydrogel polymer network is physically integrated within the web and cannot be easily separated from the fibers of the web.

In some embodiments, depending upon the nature of the fibers of the web, the type of hydrogel polymer used and the energy source used to initiate polymerization, the hydrogel polymer can also have additional chemical bonds or forces further attracting the hydrogel to the fibers of the web. For instance, the hydrogel polymer may crosslink with the fibers of the web, forming covalent bonds with the fibers of the web. In other embodiments, other chemical forces, such as van-der-Waals forces, hydrogen bonding, ionic bonding, etc., further attracting integrate the hydrogel polymer to the fibers of the web.

During manufacture of the hydrogel-fibrous web composite, a hydrogel precursor is provided in a solution form, allowing the hydrogel precursor formulation to saturate the fibrous web. In one embodiment, the hydrogel precursor formulation contains the hydrogel-forming monomer(s), a crosslinker, an initiator, and any other optional ingredients desired.

In general, any of a variety of hydrogel monomers may be utilized to form the hydrogel polymer integral to the fibers of the web. While any suitable monomer is contemplated, exemplary functional monomers include: N-vinyl pyrrolidone (NVP), hydroxyethyl methacrylate (HEMA), methacrylic acid (MA) or its salt, styrene sulfonic acid (SSA) or its salt, potassium sulfopropyl acrylate (KPSA), dimethyl acrylamide (DMA), dimethyl amino ethyl methacrylate (DMAEMA) or its quaternary salt derivative, acrylamido methyl propane sulfonic acid (AMPS) or its salt, and the combination of any of the above. Desirably, the hydrogels are made from various classes of monomers including acrylates, vinyls, amides, esters, etc, of which can be electrically neutral, cationic or anionic. Combination of functional monomers also is possible to achieve desired physical, chemical, mechanical, thermal, and other properties.

In one particular embodiment, 2-acrylamido-2-methyl propane sulfonic acid (AMPS), or its salt, can be used as the hydrogel monomer, either alone or in combination with another comonomer. Generally, AMPS provides good adhesive and thermal energy transfer properties, is easy to work with, and polymerizes relatively easily. Also, AMPS, as a monomer, has a relatively favorable safety profile. As such, AMPS or its salt may be suitable for large scale production of a hydrogel monomer precursor solution.

Generally, the hydrogel precursor includes between about 5 to about 80% by weight of the monomer, more desirably between about 20 to about 75% by weight of the monomer, and even more desirably between about 30 to about 75% by weight of the monomer.

The hydrogel monomer can also be combined with at least one co-monomer to form the hydrogel polymer. Examples of co-monomers which may be used include co-monomers soluble in water and, even more desirably, include anionic co-monomers. The amount of co-monomer to be used may be in the range of about 5 to about 50% by weight, desirably about 10 to about 30% by weight, based on the amount of reactants used. Examples of suitable co-monomers include, but are not limited to: unsaturated organic carboxylic acids such as acrylic acid, methacrylic acid, maleic acid, itaconic acid, and citraconic acid and salts thereof, unsaturated organic sulfonic acids such as styrene sulfonic acid, methallyl sulfonic acid, 2-sulfoethyl acrylate, 2-sulfoethyl methacrylate, 3-sulfopropyl acrylate, 3-sulfopropyl methacrylate, acrylamido-methylpropane sulfonic acid and salts thereof, N,N-dimethylacrylamide, vinyl acetate, other radically polymerizable ionic monomers containing a carbon-carbon double bond, and non-N-vinyl lactam co-monomers useful with N-vinyl lactam monomeric units such as N-vinyl-2-pyrrolidone, N-vinyl-2-valerolactam, N-vinyl-2-caprolactam, and mixtures thereof. Among the ionic monomers enumerated above, particularly desirable selections are 2-acrylamido-2-methyl propane sulfonic acid, and salts thereof. Examples of cations involved in the formation of such salts include sodium, potassium, lithium, and ammonium ions. Ionic monomers may be used alone or in a mixture of two or more monomers.

As mentioned above, initiators may optionally be used in the polymerization of the hydrogel precursors described herein. The initiators can be photo-initiators or chemical initiators. For example, in one particular embodiment, a UV-initiator can be included in the hydrogel precursor. In other embodiments, other radiation initiation processes, such as gamma rays, e-beam, X-ray, etc., can be utilized. In some embodiments, these radiation initiation processes may be sufficient to initiate the polymerization reaction without the presence of an initiator. Chemical initiators can also be used, such as redox, peroxide, etc.

For example, a non-limiting list of UV-initiators which may be used include IRGACURE® 184 (1-hydroxycyclohexyl phenyl ketone), IRGACURE® 2959 (4-(2-hydroxyethoxy)phenyl-(2-hydroxy-2-methylpropyl)ketone)), and DAROCURE® 1173 α-hydroxy-α,α-dimethylacetophenone), all commercially available from Ciba Specialty Chemicals (Tarrytown, N.Y.). These UV initiators are particularly useful because they are non-yellowing, i.e., they can maintain a desired water-white and/or water-clear appearance of the hydrogels.

Other initiators which may maintain the desired water-white and water-clear appearance of the present hydrogels also are desired. Additional examples of suitable initiators (which may be photo-initiators or thermally activated initiators) may include benzoyl peroxide, azo-bis-isobutyro-nitrile, di-t-butyl peroxide, bromyl peroxide, cumyl peroxide, lauroyl peroxide, isopropyl percarbonate, methylethyl ketone peroxide, cyclohexane peroxide, tutylhydroperoxide, di-t-amyl peroxide, dicumyl peroxide, t-butyl perbenzoate, benzoin alkyl ethers (such as benzoin, benzoin isopropyl ether, and benzoin isobutyl ether), benzophenones (such as benzophenone and methyl-o-benzoyl benzoate), actophenones (such as acetophenone, trichloroacetophenone, 2,2-diethoxy-acetophenone, p-t-butyltrichloro-acetophenone, 2,2-dimethoxy-2-phenyl-acetophenone, and p-dimethylaminoacetophenone), thioxanthones (such as xanthone, thioxanthone, 2-chlorothioxanthone, and 2-isopropylthioxanthone), benzyl 2-ethyl anthraquinone, methylbenzoyl formate, 2-hydroxy-2-methyl-1-phenylpropane-1-one, 2-hydroxy-4'-isopropyl-2-methyl propiophenone, α-hydroxy ketone, tetramethyl thiuram monosulfide, allyl diazonium salt, and combinations of camphorquinone and ethyl 4-(N,N-dimethylamino)benzoate. Other suitable initiators may be found in, for example, Berner, et al., "Photo-initiators—An Overview", J. Radiation Curing (April 1979), pp. 29.

Although only one initiator is necessary, the hydrogel precursor may contain one or more second initiators. The one or more second initiators can be photo or chemical initiators.

Where there is only one initiator, the amount of initiator is desirably within the range of about 0.01 to about 5% by weight of the hydrogel precursor, more desirably, within the range of about 0.05 to about 2% by weight of the hydrogel precursor and, even more desirably, within the range of about 0.1 to about 0.5% by weight of the hydrogel precursor. Where one or more second initiators are present, the amount of one or more second initiators is desirably within the range of about 0.01 to about 5% by weight of the hydrogel precursor, and more desirably within the range of about 0.05 to about 2% by weight of the hydrogel precursor and, even more desirably, within the range of about 0.1 to about 0.5% by weight of the hydrogel precursor. However, where multiple initiators are present, it is generally desirable that the combined amount of the initiators be about 5% or less by weight of the hydrogel precursor, and more desirably within the range of about 0.02 to about 5% by weight of the hydrogel precursor.

In one embodiment, the hydrogel polymer may be formed from at least one hydrogel-forming monomer by free radical polymerization in the presence of water, initiated by ultra-violet radiations (or UV curing) with a photo-initiator and a multifunctional cross-linking agent. UV curing parameters to achieve desired polymer properties are well known to those skilled in the art. A photo-initiator for the present purposes tends to operate by absorbing select wavelengths of UV to produce radical initiating species to induce monomer polymerization. The wavelengths and curing area set the style of UV bulb used in the curing process. Inhibition of polymerization due to dissolved oxygen, monomer inhibitors, or other radical scavenging moieties may be overcome by changing the power, by pulsing, and/or by using initiator accelerators.

It will be appreciated that each photo-initiator is responsive to a specific or narrow wavelength range of UV light. At least one aspect takes advantage of this property and incorporates two or more photo-initiators in a hydrogel precursor. The addition of more than one initiator in a hydrogel precursor allows for a broader range of the energy or range of wavelengths emitted by a UV source to be utilized. The utilization of multiple initiators can further reduce solubility limit concerns and related compatibility concerns, as more efficient polymerization may be able to be achieved with two initiators present in a hydrogel precursor than with either of the initiators used alone at the same overall initiator concentration. Multiple initiators may also maximize the use of the full UV spectrum available.

As is also noted above, cross-linking agents may be desirably present in the hydrogel precursor to cross-link the hydrogel polymers formed from the precursor solution of monomers. Examples of multi-functional cross-linking agents which may be used include, for example, methylene-bisacrylamide and diethylene glycol diacrylate which are both commercially available from Polysciences, Inc., Warrington, Pa. Additional examples of cross-linking agents which may be acceptable include, but are not limited to: poly(ethylene glycol) diacrylate, triethylene glycol-bis-methacrylate, ethylene glycol-bis-methacrylate, ethylene glycol-dimethacrylate, bisacrylamide, triethyleneglycol-bis-acrylate, 3,3'-ethylidene-bis(N-vinyl-2-pyrrolidone), trimethylolpropate trimethacrylate, glycerol trimethacrylate, polyethylene glycol dimethacrylate, and other multifunctional polyacrylate and polymethacrylate crosslinkers.

The amount of cross-linking agent is desirably within the range of about 0.01 to about 2% by weight of the hydrogel precursor and, more desirably, within the range of about 0.05 to about 0.5% by weight of the hydrogel precursor.

Regardless of the technique utilized, crosslinking forms a hydrogel constituted by a three-dimensional network that is substantially water-insoluble. Thus, when exposed to water, the hydrogel does not dissolve, but instead may absorb a certain amount of water. For example, the hydrogel is capable of achieving a water content of at least about 20%, such as from about 20% to about 90%, in some embodiments from about 35% to about 85%, and in some embodiments, from about 50% to about 80%. Thus, the hydrogel-fiber composite is capable of absorbing perspiration from the skin when the hydrogel-fiber composite is used as the thermal energy transfer or adhesive layer of a thermal energy transfer pad. The water content of the hydrogel is determined as follows:

$$\% \text{ water content} = 100 \times (W_w - W_d)/W_w$$

wherein $W_w$ is the weight of the wet hydrogel and $W_d$ is the weight of dry hydrogel.

In most embodiments, water is the solvent used for the hydrogel precursor formulation, although other suitable solvents can be used. Additionally, the precursor solution can also include a solubilizer to enhance the polymerization of the monomer, crosslinker, and/or initiator, such as described in U.S. Pat. No. 7,045,559, which is incorporated herein in its entirety. Any suitable solubilizer or combination of solubilizers is contemplated. The desirability of a specific solubilizer and/or the amount thereof which is included in hydrogel precursor may vary or depend in part on the other components and quantities thereof selected to make up the hydrogel precursor. Exemplary solubilizers include but are not limited to cyclodextrin, cyclodextrin derivatives, and hydrotropes. Specific exemplary cyclodextrin derivative solubilizers that are known to work include hydroxypropyl beta-cyclodextrin (HP-β-CD) (available from Cargill Dow, Minnetonka, Minn.), gamma cyclodextrin (gamma-CD) (available from Wacker Biochem Corporation, Adrian, Mich.) and other polymerizable cyclodextrin derivatives such as methacryloyl cyclodextrin. In a particular embodiment, the solubilizer is dimethyl sulfoxide (DMSO). In another particular embodiment, the solubilizer is glycerin.

If a specific initiator is selected, then some solubilizers may be more desirable than others. That being said, it is contemplated that a solubilizer may be present in a positive amount up to about 20% by weight of the hydrogel precursor and, more desirably, between about 0.5% to about 5% by weight of the hydrogel precursor.

While the use of solubilizers is contemplated so as to alleviate solubility concerns, it is also believed that the inclusion of multiple initiators, which may be present at levels which independently would have been insufficient to obtain the desired polymerization, can enable the use of additional initiators whose solubility limits in hydrogel precursors effectively precluded their use previously. It is further believed that the inclusion of initiators having different rates of initiation and/or the inclusion of initiators which begin initiation of polymerization of the monomer at different times relative to each other (such as that which may be experienced by multiple initiators (e.g., a thermally activated chemical initiator (TACI) and a photo-initiator) contributes to a higher yield of polymerization. That is, for example, where two photo-initiators are included, one may have a lower UV wavelength trigger and may be more energetic (providing for a faster rate of initiation and reaction) than the other initiator which is triggered by a higher UV wavelength or range. The faster initiator may also die or be consumed faster than the other. It is contemplated that it may be advantageous to have polymerization occur at different rates and/or at a mixed rate which may not be obtainable with one initiator or with an initiator which is suitable for a particular hydrogel precursor. An example of initiators which are not triggered or activated simultaneously, may be found where a photo-initiator and a TACI are in a hydrogel precursor, and the photo-initiator is triggered by a UV source and reacts with the monomers in the precursor so as to generate heat to trigger the TACI.

While numerous combinations and variations of initiators are possible, it is believed that the combination of multiple initiators provides more favorable kinetics which afford a higher probability of more extensive polymerization of the monomer and/or other monomeric residues. Of course, if desired or necessary, the multiple initiators also could be present at elevated solubility levels. In either instance, the inclusion of multiple initiators can result in a more completely polymerized hydrogel.

A TACI may be included to take advantage of the benefits of multiple initiator polymerization. As some heat is necessary to trigger a TACI, it is contemplated that a TACI will generally be included only where heat will be present in or produced in the hydrogel precursor in a sufficient amount to trigger the TACI. As radical polymerization reactions induced by photo-initiators are known to be exothermic and thus to generate heat in response to UV exposure, at least one aspect is directed to the inclusion of a TACI in a hydrogel precursor where a photo-initiator is also present so as to allow the TACI to take advantage of the heat generated by the radical polymerization reaction induced by a photo-initiator. It is also contemplated that a TACI can be included where multiple photo-initiators are present. The presence of multiple photo-initiators provides for the potential benefits of multiple initiators discussed above yet also provides for the triggering of a TACI where the heat generated by one photo-initiator may be insufficient to trigger or fully trigger the TACI (depending on the photo-initiators and the TACI involved), whereby the TACI can further promote or complete the polymerization of the functional monomer and other monomeric residues in a hydrogel precursor. Multiple TACIs are also contemplated.

The hydrogels may include a buffer system to help control the pH, prevent discoloration, and/or prevent breakdown due to an extended presence of water (i.e., hydrolysis). The use of a buffer system with the present hydrogel is desired to provide the hydrogel with a commercially suitable shelf-life (i.e., a shelf-life of over one year) without discoloration. Suitable buffers include but are not limited to sodium potassium tartarate, and/or sodium phosphate monobasic, both of which are commercially readily available from Aldrich Chemical Co., Inc., Milwaukee, Wis.

In some embodiments, at least one surfactant can be included in the hydrogel precursor solution or added to the hydrogel-fibrous web composite. It is believed that the presence of a surfactant can increase the rate of absorbency of water and moisture of the hydrogel. Exemplary surfactant include, but are not limited to, alkyl polyglycosides; silicones modified to contain alkyl, polyglycol, and/or amino groups (e.g., ethyoxylated polydimethyl siloxanes); alkylphenol ethoxylate surfactant; and the like. Commercially available examples of suitable alkyl polyglycosides include Glucopon 220, 225, 425, 600 and 625, all available from Cognis Corporation. These products are all mixtures of alkyl mono- and oligoglucopyranosides with alkyl groups based on fatty alcohols derived from coconut and/or palm kernel oil. Glucopon 220, 225 and 425 are examples of particularly suitable alkyl polyglycosides. Glucopon 220 is an alkyl polyglycoside which contains an average of 1.4 glucosyl residues per molecule and a mixture of 8 and 10 carbon alkyl groups (average carbons per alkyl chain—9.1). Glucopon 225 is a related alkyl polyglycoside with linear alkyl groups having 8 or 10 carbon atoms (average alkyl chain—9.1 carbon atoms) in the alkyl chain. Glucopon 425 includes a mixture of alkyl polyglycosides which individually include an alkyl group with 8, 10, 12, 14 or 16 carbon atoms (average alkyl chain—10.3 carbon atoms). Glucopon 600 includes a mixture of alkyl polyglycosides which individually include an alkyl group with 12, 14 or 16 carbon atoms (average alkyl chain 12.8 carbon atoms). Glucopon 625 includes a mixture of alkyl polyglycosides which individually include an alkyl group having 12, 14 or 18 carbon atoms (average alkyl chain 12.8 carbon atoms). Another example of a suitable commercially available alkyl polyglycoside is TL 2141, a Glucopon 220 analog available from ICI. BASF Corporation offers MASIL® silicones that are modified to contain alkyl, polyglycol, amino groups, which may be included in the hydrogel precursor formulation. For instance, MASIL® SF-19 is a modified silicone glycol.

The amount of hydrogel integrated into the fibrous web can be controlled by the amount of hydrogel monomer present in the precursor solution and the amount of precursor solution added onto the fibrous web. As such, controlling the amount of hydrogel in the composite web allows for control of the skin adhesion properties and thermal conductivity of the composite web. Depending on the intended use of the hydrogel-fibrous web composite, the hydrogel can be present in the hydrogel-fibrous web composite at relatively high add-on levels, such as from about 100% to about 10,000% by weight, such as from about 500% to about 9,000% by weight, from about 1,000% to about 8,000%, from about 2,000% to about 7,000%, or from about 3,000% to about 6,000%. In other embodiments, the add-on level of the hydrogel to the fibrous web may be from about 100% to about 1,000%, from about 150% to about 900%, from about 200% to about 800%, or from about 250% to about 700%. Expressed in terms of basis weight, the hydrogel can be present in the hydrogel-fibrous web composite at basis weights of from about 10 gsm to about 1,000 gsm or even higher, from about 50 gsm to about 900 gsm, from about 100 gsm to about 800 gsm, from about 200 gsm to about 700 gsm, or from about 300 gsm to about 600 gsm, though higher or lower basis weights may be desired depending on the particular use.

Also, the location of the hydrogel integrated within the web can be somewhat controlled by the wettability and structure of the web and the manner of application of the hydrogel precursor formulation to the web. For instance, application of the hydrogel precursor formulation to only one side of the web, and subsequent polymerization, can result in the hydrogel polymer being present mainly in that side of the web. Desirably, for use in a thermal energy transfer pad, the hydrogel precursor will be polymerized on both sides of the web. Viscosity modifiers can also be added to increase the viscosity of the hydrogel precursor formulation to allow for controlled placement and formation of the hydrogel following polymerization.

As one skilled in the art will recognize, any method of saturating and/or impregnating the hydrogel precursor formulation into the web may be used. For example, the hydrogel precursor formulation may be applied to the fibrous web using any conventional technique, such as bar, roll, knife, curtain, foam, print (e.g., rotogravure), slot-die, drop-coating, or dip-coating techniques. For instance, the hydrogel precursor formulation can be applied topically to the external surfaces of the fibrous web. In one particular embodiment, the hydrogel precursor formulation is applied uniformly to both surfaces of the fibrous web.

Figure 1:
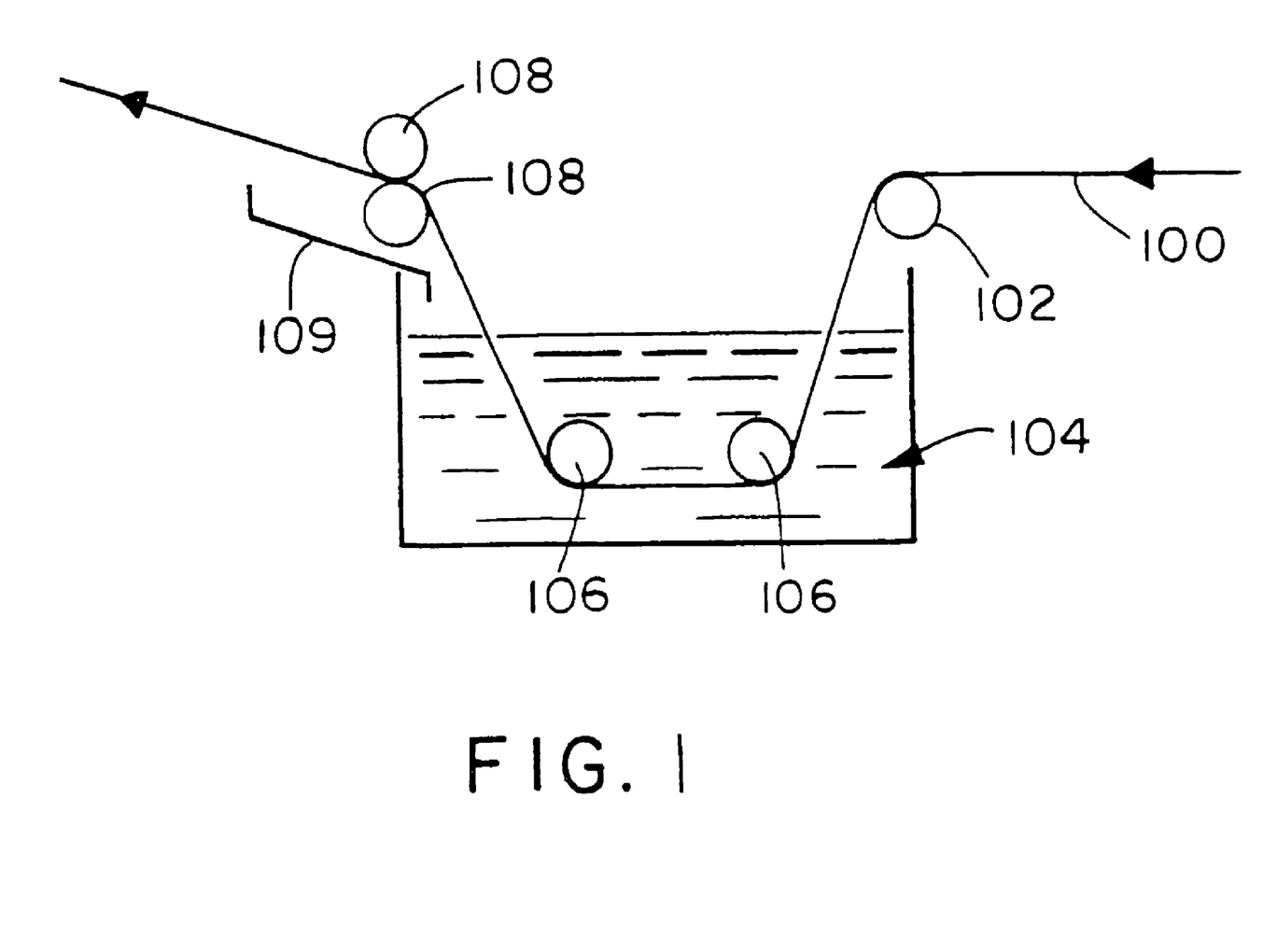
FIG. 1 is an exemplary embodiment of a process for impregnating a hydrogel monomer precursor formulation into a fibrous web.

FIG. 1 illustrates an exemplary embodiment using a web saturation step. As shown, a fibrous web 100 passes over a guide roll 102 and into a bath 104 with the treatment time controlled by first and second guide rolls 106. The nip between first and second squeeze rolls 108 removes any excess hydrogel precursor formulation which is returned to the bath by a catch pan 109.

In other application techniques, where one desires to treat only a single side, and not the inner layers or opposing side of the fibrous web, other processes can be used, such as rotary screen, reverse roll, Meyer-rod, Gravure, slot-die, gap-coating, etc. However, even according to these application techniques, a sufficient amount of the hydrogel precursor formulation penetrates the web, allowing the hydrogel to be integral to the fibers upon polymerization.

No matter the method of impregnation or saturation of the web, the hydrogel monomers saturated and/or impregnated within the web may be polymerized, either before or after drying of the web, depending on the polymerization initiation method. For instance, when a UV-initiator is present in the hydrogel precursor formulation to initiate the polymerization of the hydrogel monomers upon the application of UV radiation, the web 100 can be passed under a UV lamp (not shown) for a specific time allowing for the desired degree of polymerization, prior to drying the web. Then, the web 100 can be further dried, if needed, by passing over dryer cans (not shown) or other drying means and then wound between two release film or paper layers as a roll or converted to the use for which it is intended. Alternative drying means include ovens, through air dryers, infra red dryers, air blowers, and the like.

Drying the hydrogel-fibrous web composite can control the water content of the hydrogel in the composite, which can affect the thermal conductivity of the hydrogel-fibrous web composite. For thermal conductivity applications, the water content of the hydrogel in the hydrogel-fibrous web composite will be relatively high, which provides for greater thermal conductivity. For example, the water content of the hydrogel in the hydrogel-fibrous web composite will desirably be greater than about 20 wt. %, such as greater than about 40 wt. %. For instance, the water content of the hydrogel in the hydrogel-fibrous web composite will be from about 20 wt. % to about 80 wt. %, such from about 30 wt. % to about 70 wt. %, or from about 40 wt. % to about 60 wt. %.

Figure 2:
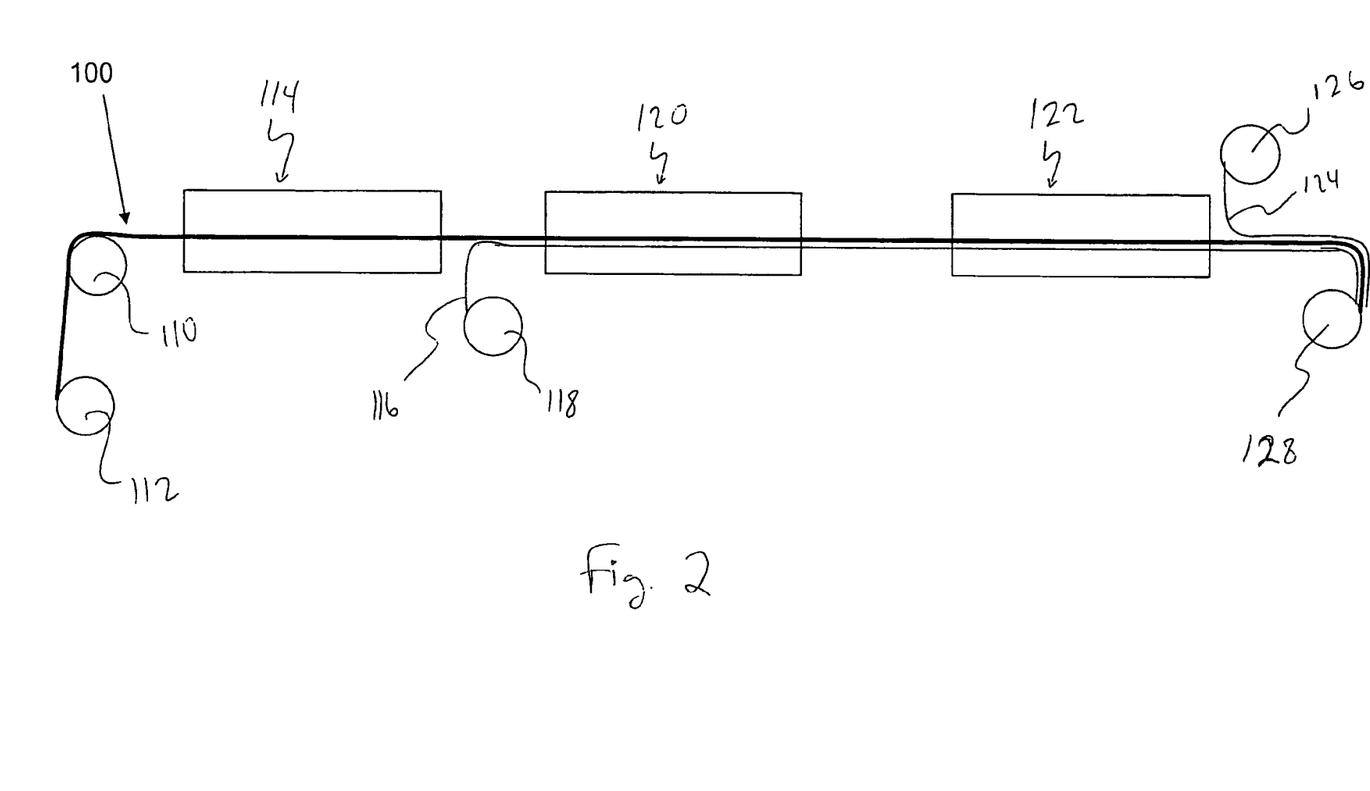
FIG. 2 is an exemplary schematic of an embodiment of a process for producing a hydrogel-fibrous web composite.

For example, referring to the schematic shown in FIG. 2, the fibrous web 100 passes over a guide roll 110 from a fibrous web supply roll 112. First, the fibrous web 100 is impregnated or saturated with the hydrogel precursor formulation in a treatment center 114. Then, the treated fibrous web 100 is combined with a first release layer 116 supplied from a release layer supply roll 118. The treated fibrous web 100 is then cured in a curing station 120, such as, for example, by UV radiation. The fibrous web 100 is then dried in a dryer 122, and combined with a second release layer 124 supplied from a release layer supply roll 126. Finally, the treated fibrous web 100 sandwiched between the first release layer 116 and the second release layer 124 can then be rewound on a roll 128.

It is also understood that the method of treatment of the fibrous web with the impregnating hydrogel precursor formulation may also incorporate other ingredients into the web. For example, the precursor formulation may include other additives, such as conductivity enhancers, pharmaceuticals, humectants, plasticizers, skin health agents, odor control agents, antioxidants, dyes, scent, preservatives, anti-microbial agents, anti-viral agents, and the like, within the fibrous web. These other additives may be included either before or after a curing step. For instance, in some embodiments, the additives may be present in the hydrogel precursor formulation, which can help the additive become impregnated within the resulting hydrogel-fibrous web composite. The appropriateness of such additives is generally dependent upon the intended end use of the particular hydrogel.

Any suitable additive or combination of additives such as those suggested above is contemplated. The specific additive and/or the amount thereof which is included may vary or depend in part on the other components and quantities thereof selected to make up the hydrogel. Exemplary skin health agents and/or skin care ingredients include but are not limited to vitamins (e.g., B, D, E, E acetate, etc.), antioxidants, chitosan, aloe Vera, hyaluronic acid (HA), heparin, chondroitin sulfate, dextran sulfate, glycerin, and collagen IV. Still other exemplary additives may include but are not limited to anti-inflammation agents, anti-oxidants, antimicrobial agents, aesthetic agents (e.g., color dyes to alter appearance of the hydrogels), or fragrances.

The hydrogel can be integrated into any suitable fibrous web, including both woven and nonwoven webs. In general, the intended end use of the composite web will dictate the composition and type of web utilized. In one particular embodiment, the fibrous web is a porous fibrous web. In this embodiment, the porosity of the fibrous web allows the hydrogel to penetrate the pores of the web for improved energy transfer through the thickness of the web. In other embodiments, porous films and foams can also be used in similar fashion as porous webs.

For example, the nonwoven web may be a spunbond web, a meltblown web, a bonded carded web, or another type of nonwoven web, including natural and/or synthetic fibers, and may be present in a single layer or a multilayer composite including one or more nonwoven web layers.

When constructed of synthetic polymers, a wide variety of thermoplastic polymers may be used to construct the nonwoven substrate, including without limitation polyamides, polyesters, polyolefins, copolymers of ethylene and propylene, copolymers of ethylene or propylene with a $C_4$-$C_{20}$ alpha-olefin, terpolymers of ethylene with propylene and a $C_4$-$C_{20}$ alpha-olefin, ethylene vinyl acetate copolymers, propylene vinyl acetate copolymers, styrene-poly(ethylene-alpha-olefin) elastomers, polyurethanes, A-B block copolymers where A is formed of poly(vinyl arene) moieties such as polystyrene and B is an elastomeric midblock such as a conjugated diene or lower alkene, polyethers, polyether esters, polyacrylates, ethylene alkyl acrylates, polyisobutylene, polybutadiene, isobutylene-isoprene copolymers, and combinations of any of the foregoing. In some particular embodiments, polyolefins, such as polyethylene and polypropylene homopolymers and copolymers, can be used to construct the nonwoven web. The webs may also be constructed of bicomponent or biconstituent filaments or fibers. The nonwoven webs may have a wide variety of basis weights, desirably ranging from about 8 grams per square meter (gsm) to about 120 gsm. Desirably, the basis weight of the nonwoven web will be sufficiently high to provide sufficient mechanical properties to the composite material for its intended use. In some embodiments, the nonwoven web may be a polypropylene spunbond web having a basis weight ranging from about 8 gsm to about 33 gsm.

In some embodiments, the nonwoven web can be a composite nonwoven web, including but not limited to, coform webs, webs entangled with pulp fibers, etc. For instance, a suitable nonwoven composite web can be a polypropylene web entangled with pulp fibers, such as the fabric sold under the name Hydroknit® by Kimberly-Clark Corp., Inc. of Neenah, Wis.

In another embodiment, the web can be a woven web. For instance, certain applications will typically involve woven webs of cotton, polyester, nylon, wool, and the like, and combinations thereof. For example, in some clothing applications, the fibrous web can be a woven web.

Additionally, the hydrogel-fibrous web composite can be combined with other webs to form a laminate. For instance, the hydrogel-fibrous web composite can be one or more layers of a spunbond-meltblown-spunbond (SMS) web.

The fibrous webs integrated with a hydrogel can be used in any application where it is desirous to provide a layer having good thermal conductivity or skin adhesiveness properties. Although fibrous webs integrated with a hydrogel are particularly suited for use as a skin-contacting layer in a thermal energy transfer pad as described in the following discussion and the attached figures, one of ordinary skill in the art will appreciate that the use of the fibrous webs is not limited to these particular applications. Composite hydrogel-fibrous webs can be utilized, for instance, as skin protectant pads for burn patients, skin protectant pads to immobilize skin toxins for pre-operative prevention of infections, transdermal delivery systems for delivery of active ingredients in the hydrogel to a user's skin, and absorbent thin materials for absorbing bodily fluids.

Figure 3:
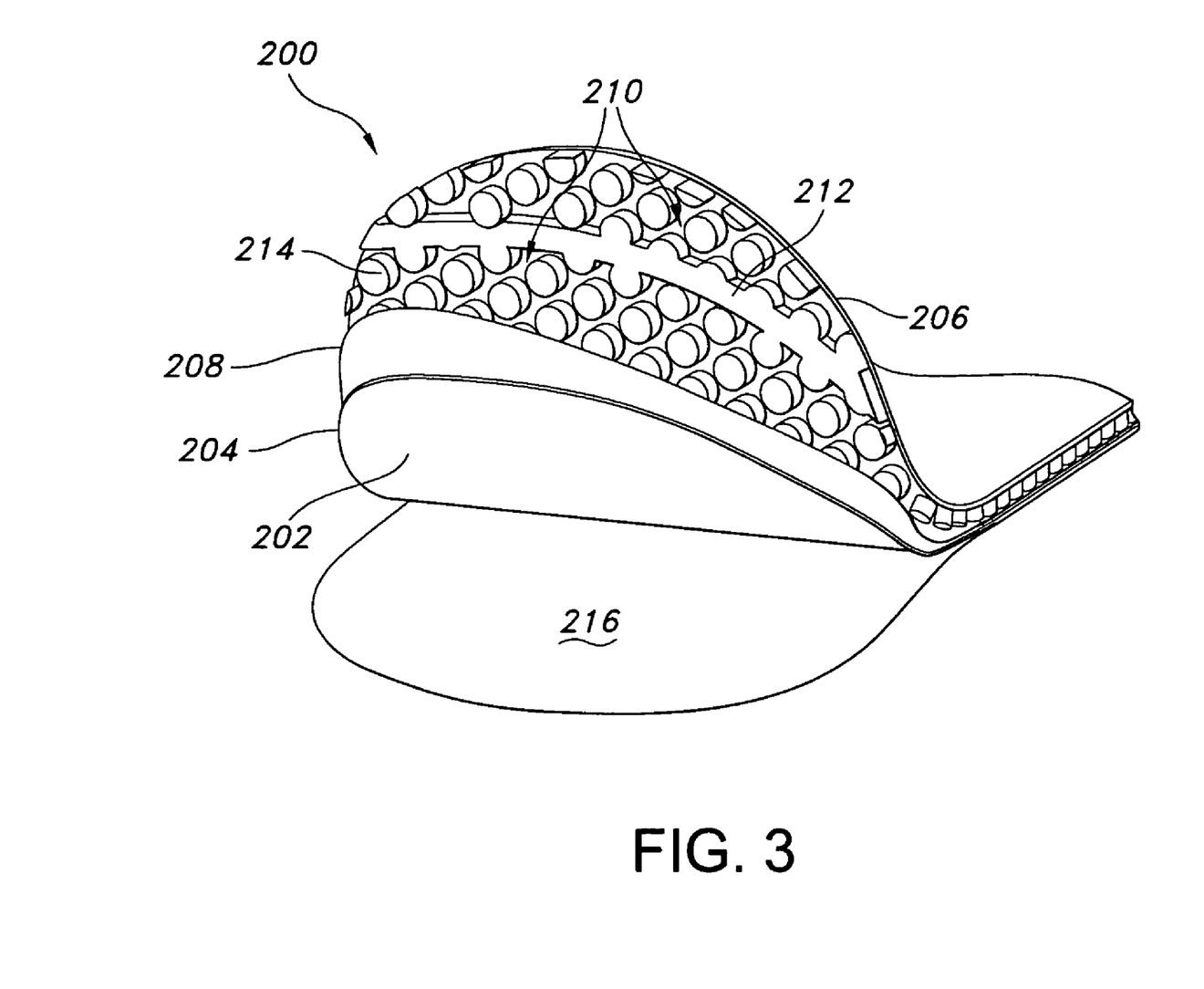
FIG. 3 is an exemplary embodiment of a thermal energy transfer pad including a skin-contacting hydrogel-fibrous web composite.

Referring to FIG. 3, an exemplary thermal energy transfer pad 200 includes a skin-contacting layer 204. The skin-contacting layer 204 may be any of the suitable thermally conductive, adhesive hydrogel-fibrous webs described herein.

The thermal energy transfer pad 200 may further include an outer layer 206 and a middle layer 208. A fluid, such as water, may be circulated through channels 210 between the outer layer 206 and the middle layer 208 to cool or heat the pad 200. The outer layer 206 and the middle layer are desirably water impermeable to contain the circulating fluid therebetween. The pad 200 may further include one or more ribs 212 attached to the outer layer 206 and extending between the outer layer and the middle layer 208. The ribs 212 may be positioned to distribute the flow of water through the channels 210 and provide uniform energy transfer across the surface area of the pad 200. The pad 200 may further include an array of studs 214 attached to the outer layer 206 and extending between the outer layer and the middle layer 208. The studs 214 inhibit collapse of the channels 210, thus improving fluid flow through the channels. The outer layer 206 desirably prevents energy loss to the environment. In one embodiment, the outer layer 206 may be constructed of a water-impermeable polyurethane polymer. The middle layer 208 may be a thin, water-impermeable polymer film that seals the channels 210. In one embodiment, the middle layer 208 may be constructed of one or more films. Exemplary films used to construct the middle layer may be, for example, polyethylene films having thickness between about 0.002 inches and about 0.050 inches. The middle layer 208 desirably does not substantially interfere with energy transfer between the layers. The pad 200 may further include a release cover 216. The release cover 216 protects the skin-contacting layer 204 until use, at which time the release cover may be peeled away to expose an adhesive surface 202 of the skin-contacting layer 204. The release cover 216 may be The adhesive, thermally conductive hydrogel-fibrous web composites described herein may be utilized as the skin-contacting thermally conductive adhesive layers in other various constructions of thermal energy transfer pads as taught in U.S. Pat. No. 6,197,045 to Carson, U.S. Pat. No. 6,375,674 to Carson, U.S. Pat. No. 6,461,379 to Carson et al., U.S. Pat. No. 6,648,905, to Hoglund et al., and U.S. Pat. No. 6,669,715 to Hoglund et al., the contents of which are incorporated herein by reference.

EXAMPLES

Example 1

The following monomer solutions were produced. The embedded fabric was then saturated with the respective solution. Then, each saturated fabric was exposed to UV light using the UV Curing equipment F600S Ultraviolet Lamp System (Fusion UV Systems, Inc., Woburn, Mass.), which delivers a dose of about 5.0 J/cm$^2$.

TABLE 1

| INGREDIENT | Wt % |
|---|---|
| Water | 16.15 |
| AMPS 2405 | 62.50 |
| MBA (1% soln) | 10.00 |
| Glycerine | 10.00 |
| DMSO | 1.25 |
| I-184 | 0.10 |

Embedded fabric: 0.5 osy polypropylene SMS

TABLE 2

| INGREDIENT | Wt % |
|---|---|
| Water | 0.00 |
| AMPS 2405 | 78.65 |
| MBA (1% soln) | 10.00 |
| Glycerine | 10.00 |
| DMSO | 1.25 |
| I-184 | 0.10 |

Embedded fabric: 0.5 osy polypropylene SMS

TABLE 3

| INGREDIENT | WT % |
|---|---|
| Water | 15.95 |
| AMPS 2405 | 62.50 |
| MBA (1% soln) | 10.00 |
| Glycerine | 10.00 |
| DMSO | 1.25 |
| I-184 | 0.10 |
| Aloe cucumber aloe # 51341 | 0.20 |

Embedded fabric: 0.5 osy polypropylene SMS

The commercial name and/or abbreviations of the ingredients listed above are as follows:

AMPS 2405 is 2-acrylamido-2-methyl propane sulfonic acid, sodium salt (50% active), available from Noveon, Inc. (Cleveland, Ohio);

MBA is Methylene bis-acrylamide, available from Aldrich (Milwaukee, Wis.);

Glycerine is available from Aldrich (Milwaukee, Wis.);

DMSO is dimethyl sulfoxide, available from Aldrich (Milwaukee, Wis.);

I-184 is a photoinitiator available from Ciba Specialty Chemicals, Inc. (Tarrytown, N.Y.) believed to include 1-hydroxycyclohexyl phenyl ketone; and Aloe cucumber aloe #51341 is available from Aloecorp, Lacey, Wash.

Each of the formulations shown in Tables 1-3 produced hydrogels that were fully integrated with the nonwoven web and which exhibited good adhesive properties and good mechanical strength such that when the hydrogel-nonwoven web is adhered to skin and then peeled off, the hydrogel retains its structural integrity and does not leave any residue on the skin.

Example 2

The following hydrogel precursor formulation was produced:

TABLE 4

| INGREDIENT | WT % |
|---|---|
| Water | 26.78 |
| AMPS 2405 | 60 |
| MBA (1% soln) | 1 |
| I-184 | 0.10 |
| DMSO | 3.12 |

The following fabrics were then saturated with the hydrogel precursor formulation of Table 4. A surface treatment containing a surfactant was also applied via saturation to the hydrogel-fibrous web composite. Then, each saturated fabric was exposed to UV light using the UV Curing equipment F600S Ultraviolet Lamp System (Fusion US Systems, Inc., Woburn, Mass.), which delivers a dose of about 5.0 J/cm$^2$.

Table 5:

TABLE 5

| Sample | Type of Web | Basis Weight (gsm) | Hydrogel add-on (wt %) | Surface Treatment |
|---|---|---|---|---|
| 1 | Polypropylene meltblown | 20 | 1373 | 2 wt % Glucopon 220 UP |
| 2 | Polypropylene meltblown | 20 | 1373 | 0.5 wt % Glucopon 220 UP |
| 3 | Hydroentangled polypropylene spunbond | 54 | 2553 | 0.5 wt % Glucopon 220 UP |
| 4 | Hydroentangled polypropylene spunbond | 54 | 2553 | 0.5 wt % Masil SF-19 |
| 5 | Polypropylene meltblown | 20 | 1373 | None |
| 6 | Polypropylene bonded carded web | 54 | 1510 | 0.5 wt % Glucopon 220 UP |
| 7 | Polypropylene bonded carded web | 54 | 1510 | None |
| 8 | Polypropylene meltblown | 20 | 1373 | 0.5 wt % Masil SF-19 |
| 9 | Polypropylene bonded carded web | 54 | 1510 | 0.5 wt % Glucopon 220 UP |
| 10 | Hydroentangled polypropylene spunbond | 54 | 2553 | None |
| 11 | Polypropylene bonded carded web (54 gsm) + Polypropylene meltblown (20 gsm) | 74 | 1491 | None |
| 12 | Polypropylene bonded carded web (54 gsm) + Polypropylene meltblown (20 gsm) | 74 | 1491 | 0.5 wt % Glucopon 220 UP |
| 13 | Polypropylene bonded carded web (54 gsm) + Polypropylene meltblown (20 gsm) | 74 | 1491 | 0.5 wt % Masil SF-19 |
| 14 | Woven cotton Muslin Cloth #3 available from Testfabrics, Inc. (Penn.) | | 215 | None |
| 15 | Hydroentangled pulp/polypropylene composite (21% polypropylene, 79% pulp) | 64 | 616 | None |

Each of the fabrics shown in Table 5 produced hydrogels-fibrous web composites that were fully integrated and which exhibited good adhesive properties and good mechanical strength such that when the hydrogel-nonwoven web is adhered to skin and then peeled off, the hydrogel retains its structural integrity and does not leave any residue on the skin.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto. Further, it is recognized that many embodiments may be conceived that do not achieve all of the advantages of some embodiments, yet the absence of a particular advantage shall not be construed to necessarily mean that such an embodiment is outside the scope of the present invention. In addition, it should be noted that any given range presented herein is intended to include any and all lesser included ranges. For example, a range of from 45-90 would also include 50-90; 45-80; 46-89 and the like. Thus, the range of 95% to 99.999% also includes, for example, the ranges of 96% to 99.1%, 96.3% to 99.7%, and 99.91% to 99.999%, etc.

What is claimed is:

1. A thermally conductive fibrous material comprising
a web of fibers; and
a hydrogel integrated within said fibers of said web, wherein the hydrogel has a three-dimensional crosslinked structure that is intertwined with the fibers of the web, the hydrogel comprising a monomer, an initiator, a cross-linking agent, and a solubilizer selected from the group consisting of cyclo-dextrin, cyclodextrin derivatives, and hydrotropes.

2. A thermally conductive fibrous material as in claim 1, wherein said monomer is selected from the group consisting of N-vinyl pyrrolidone, hydroxyethyl methacrylate, methacrylic acid or its salt, styrene sulfonic acid or its salt, potassium sulfopropyl acrylate, dimethyl acrylamide, dimethyl amino ethyl methacrylate or its quaternary salt derivative, and acrylamido methyl propane sulfonic acid or its salt.

3. A thermally conductive fibrous material as in claim 1, wherein said initiator is a photo-initiator and wherein polymerization of the hydrogel monomer is initiated by UV light.

4. A thermally conductive fibrous material as in claim 1, wherein said crosslinker is selected from the group consisting of methylene-bis-acrylamide, diethylene glycol diacrylate, poly(ethylene glycol) diacrylate, triethylene glycol-bis-methacrylate, ethylene glycol-bis-methacrylate, ethylene glycol-dimethacrylate, bisacrylamide, triethyleneglycol-bis-acrylate, 3,3'-ethylidene-bis(N-vinyl-2-pyrrolidone), trimethylolpropate trimethacrylate, glycerol trimethacrylate, polyethylene glycol dimethacrylate, and polymethacrylate crosslinkers.

5. A thermally conductive fibrous material as in claim 1, wherein the basis weight of the web of fibers is from about 8 gsm to about 40 gsm.

6. A thermally conductive fibrous material as in claim 1, wherein the basis weight of the hydrogel is from about 10 gsm to about 1000 gsm.

7. A thermal energy transfer pad comprising the thermally conductive fibrous material as in claim 1.

8. A thermally conductive fibrous material as in claim 1, wherein said web of fibers comprises a nonwoven web.

9. A thermally conductive fibrous material as in claim 8, wherein said nonwoven web comprises a spunbond web.

10. A thermally conductive fibrous material as in claim 1, wherein the hydrogel-fibrous web composite has a water content of from about 20% by weight to about 80% by weight.

11. A thermally conductive fibrous material as in claim 1, wherein the hydrogel has a water content greater than about 20% by weight.

\* \* \* \* \*